April 26, 1955 D. TROSSI 2,706,913
MECHANICAL MOVEMENT FOR CONVERTING TRANSLATORY MOTION
INTO ROTARY MOTION, AND VICE VERSA, ESPECIALLY
FOR PRECISION INSTRUMENTS
Filed June 1, 1953
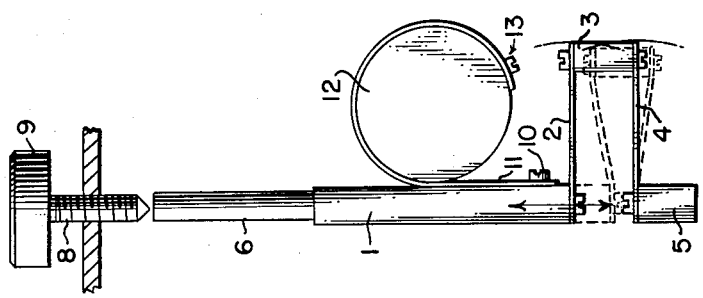
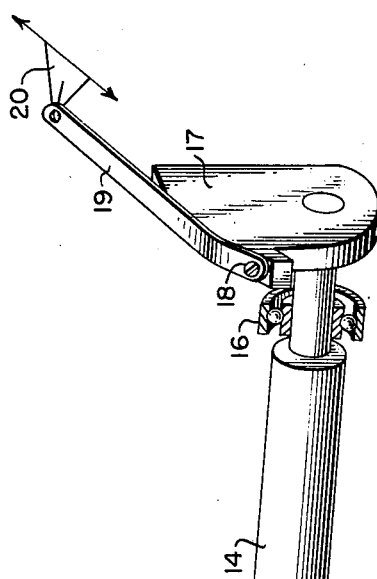
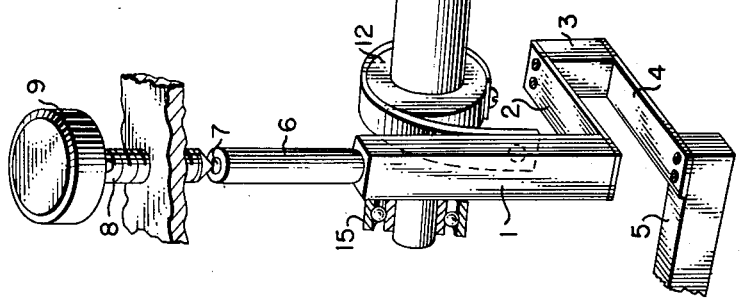
INVENTOR
DOMENICO TROSSI
BY *Hall + Houghton*
ATTORNEY United States Patent Office 2,706,913
Patented Apr. 26, 1955

2,706,913

MECHANICAL MOVEMENT FOR CONVERTING TRANSLATORY MOTION INTO ROTARY MOTION, AND VICE VERSA, ESPECIALLY FOR PRECISION INSTRUMENTS

Domenico Trossi, Turin, Italy

Application June 1, 1953, Serial No. 358,831

5 Claims. (Cl. 74—95)

The present invention relates to kinetic mechanisms for converting translatory motion into rotary motion, and vice versa, and aims to provide an improved device of this character particularly, but not exclusively, adapted for controlling the movement of members forming parts of precision instruments, for example, to control the movement of a specimen carriage of a microscope.

According to the present invention, a member having a rectilinear motion is supported and guided by means of a rectilinear motion spring-couple that in the simple form shown comprises a pair of elastic plates forming a tweezer type expanding tongs that has its plane intermediate its legs perpendicular to its axis of movement. One of these plates or sping legs is affixed to one end of the moving member and is connected at its opposite end to the other plate, which has its free end affixed in turn to a supporting structure located in line with the path of movement of the moving member. The two plates so arranged form the two sides of a deformable quadrilateral that permit guiding the translatory movement without friction and at the same time prevent the twisting of the translating member due to the movement of the rotating control member.

The translating member is connected to the rotating member by means of a flexible band which is wound upon a drum rotating therewith.

Further characteristics of the invention will appear from the following description of an illustrative embodiment thereof with reference to the annexed drawing, in which:

Figure 1 is a diagrammatic perspective view of an embodiment of the invention; and Figure 2 is a side view of Figure 1 showing the preferred relation between the parts.

In the illustrated embodiment, the translating member 1 has its lower end affixed to an elastic plate 2 that extends substantially perpendicular to the axis of translation. The opposite end of plate 2 is affixed to a rectangular block 3 shown as extending parallel to the member 1. There is affixed to block 3 a second elastic plate 4, the opposite end of which is mounted on a fixed support 5 underlying the longitudinal projection of member 1. The translating member 1, as shown, is provided at its end remote from the plates 2 and 4 with an extension 6 including a seat 7 into which there is engaged the point of an adjusting screw 8 having an operating knob 9, and which is adjustably threaded in a fixed support (not shown).

The supporting system for the translating member 1, consisting of the symmetrical bifurcated spring means 2, 3, 4 with its median plane between its legs perpendicular to the direction of translation, permits guiding the translatory member without friction and at the same time prevents the twisting or rotation of member 1 through the frictional contact of screw 8 in seat 7, when the screw is turned.

At a point 10 there is affixed to member 1 a flexible band or ribbon 11 of metal or other suitable material secured to and wound upon a drum 12, shown as made integral with shaft 14 which shaft is supported on bearings 15 and 16. The translatory motion of member 1 is thus converted into a rotary motion of shaft 14 and vice versa.

Shaft 14 carries a second drum or sector 17, about which there is wrapped a second ribbon or flexible band 19 anchored at one of its ends 18 to the second drum 17, and at its other end to a second movable means 20, herein shown as linearly movable in a plane perpendicular to the axis of movement of the member 1. The drums or drum sectors 12 and 17, as shown, are concentric with the axis of rotation of shaft 14, and multiply the motion of member 1 in proportion to the ratio of their radii, and the ratio of rotation of the screw 8 to the longitudinal movement of the member 1 is determined by the pitch of the screw.

In the particular arrangement shown, the drum 12 and band 11 are relatively wide and the translatory member 1 has a flat face capable of lying tangent to the standing part of the band from its point of inflection to its point of connection to the translatory member. Thus the drum, band, and translatory member as shown in Fig. 2 may be mutually supporting over an area of considerable width, aiding in preventing any turning of the translatory member by the friction of screw 8 and providing for peripheral rotation of the drum by an amount corresponding directly to the motion of the translatory member.

While in the broader aspects of the invention other forms of rectilinear motion twist resisting spring supports may be employed, that shown is particularly desirable because of its simplicity and ease of manufacture to exact functional tolerances.

As will be apparent from the above description of a preferred embodiment, the transmission device afforded by this invention provides for every angular movement of screw 8 a directly proportional movement of member 20, without regard to the sines of the angles, and thus affords a precision reducer or multiplier.

While there have been described herein what are at present considered preferred embodiments of the invention, it will be obvious to those skilled in the art that minor modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A device of the class described comprising a support, a translatory member movable toward and away from said support, a rectilinear motion twist resisting spring means connecting said translatory member to said support, a rotary member having drum means thereon, and flexible band means connected at one end to said translatory member and attached to and in part wound about said drum means for rotating said drum through a peripheral arc proportional to the movement of the translatory member.

2. A device according to claim 1 further comprising a second drum means on said rotary member, a second band attached to and partly wound about said second drum means, and a second translatory member to which the free end of said second band is attached, said second translatory member moving in a plane at an angle to the plane in which the first translatory member moves.

3. A device according to claim 1 in which the rectilinear motion spring means is in the form of a symmetrical bifurcated tweezer tongs having the free ends of its legs respectively affixed to said translatory member and to said support, and having its median plane between said legs perpendicular to the axis of translation of the translatory member.

4. A device according to claim 1 in which the rectilinear motion spring is in the form of two identical flat spring plates each secured at one end to parallel faces of an intervening spacer block extending perpendicular to such faces and extending in the same direction from said block, and each secured at its other end to parallel supporting faces on the support and on the translatory member respectively which supporting faces are perpendicular to the axis of translation of the translatory member.

5. A translatory motion element for precision instruments comprising a rod-like member having a seat at one of its ends, an adjusting screw having a tip engaging in said seat, and means for preventing rotation of said rod-like member and for supporting it for linear lengthwise motion under adjustment of said screw while keeping its seat pressed against said screw tip, said last named means comprising a support opposite the end of the member remote from said screw, said support and said member having opposed flat faces perpendicular to the axis of translation of the member, a pair of identical flat spring plates affixed respectively to said opposed flat faces and extending laterally therefrom and having their opposite ends secured to opposite parallel faces of a spacer block extending perpendicularly between said ends, the median plane of the plate and block assembly thus extending perpendicular to the axis of translation of the member.

References Cited in the file of this patent

UNITED STATES PATENTS

| | | |
|---|---|---|
| 2,195,400 | Arens | Apr. 2, 1940 |
| 2,477,985 | Keim | Aug. 2, 1949 |
| 2,505,111 | Hall | Apr. 25, 1950 |